United States Patent [19]

Zelt

[11] 4,384,223
[45] May 17, 1983

[54] RADIO-FREQUENCY INTERFERENCE SUPPRESSING SYSTEM FOR PERMANENT MAGNET FIELD MOTOR

[75] Inventor: Edward J. Zelt, St. Marys, Pa.

[73] Assignee: The Stackpole Corporation, St. Marys, Pa.

[21] Appl. No.: 254,257

[22] Filed: Apr. 15, 1981

[51] Int. Cl.³ ............................................. H02K 11/00
[52] U.S. Cl. .................................. 310/68 R; 310/71; 310/72
[58] Field of Search .................... 310/68, 67, 71, 72, 310/220, 275

[56] References Cited

U.S. PATENT DOCUMENTS

| | | | |
|---|---|---|---|
| 2,048,096 | 7/1936 | Bisley | 310/72 X |
| 3,189,772 | 6/1965 | Wingler et al. | 310/71 X |
| 3,373,301 | 3/1968 | Black | 310/72 |
| 3,974,407 | 8/1976 | Dochterman | 310/71 |
| 4,268,770 | 5/1981 | Iwaki et al. | 310/68 X |
| 4,323,804 | 4/1982 | Zelt | 310/220 X |
| 4,329,605 | 5/1982 | Angi et al. | 310/68 |

Primary Examiner—Donovan F. Duggan
Attorney, Agent, or Firm—Carothers & Carothers

[57] ABSTRACT

A radio-frequency interference suppressing system for inside a permanent magnet field motor case includes a pair of commutator brushes, a pair of power input terminals electrically connected with the brushes, a capacitor electrically connected across the terminals, a pair of capacitors each electrically connected to a different one of the two terminals, and a grounding member electrically connected with the pair of capacitors for engaging the inside of the motor case.

4 Claims, 7 Drawing Figures

RADIO-FREQUENCY INTERFERENCE SUPPRESSING SYSTEM FOR PERMANENT MAGNET FIELD MOTOR

Electric motors with permanent magnet fields produce radio-frequency noise that is conducted out along the power input leads of the motor and interferes with nearby radio reception. To suppress such interference, capacitors have been connected into added-on harness outside of the motors. This is expensive and cumbersome.

It is among the objects of this invention to provide for suppressing such radio-frequency interference with a network or system which is built into the motor, which is inexpensive and which can be supplied as a unit by someone other than the motor builder.

The preferred embodiment of the invention is illustrated in the accompanying drawings, in which FIG. 1 is a side view of a permanent magnet field motor with part of the case broken away;

Figure 1:
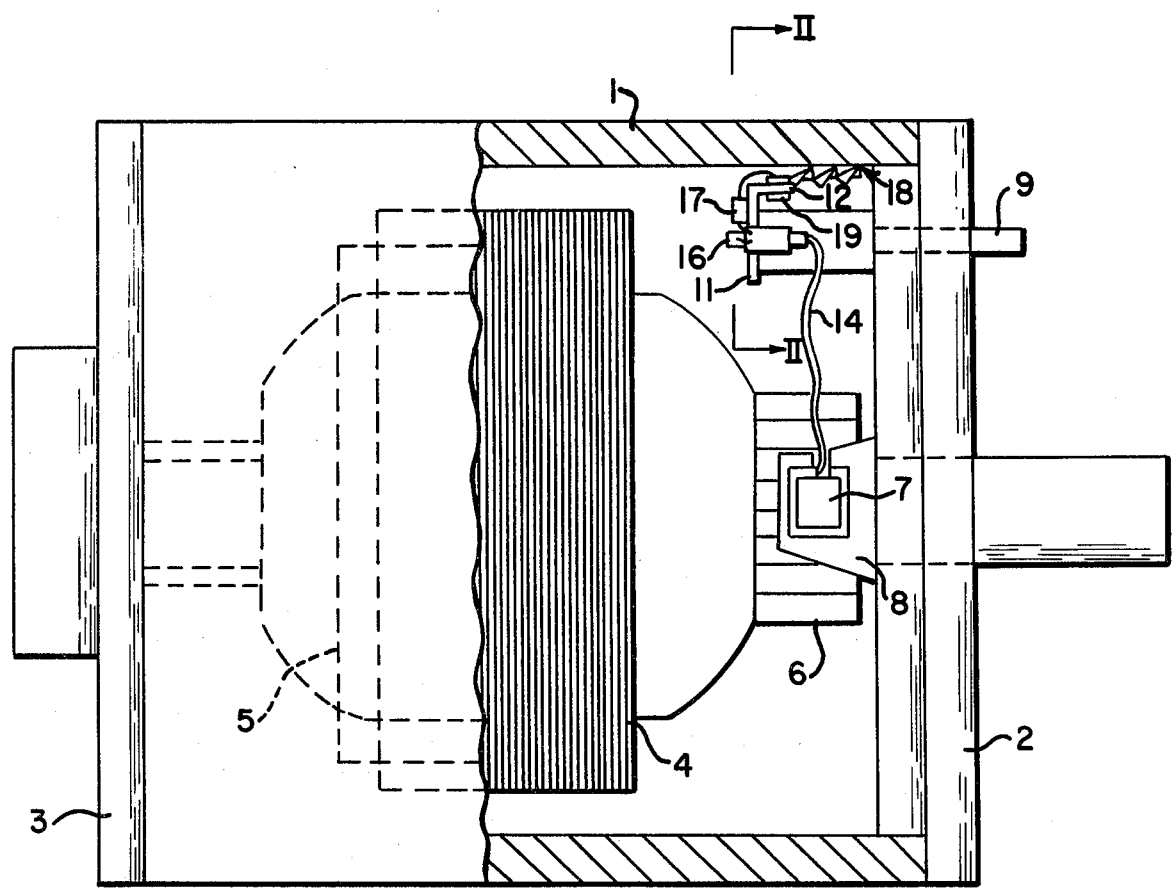
Figure 2:
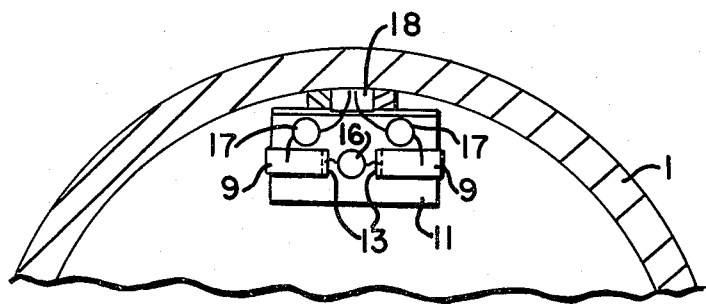
FIG. 2 is a fragmentary cross section taken on the line II—II of FIG. 1.

Referring to FIG. 1 of the drawings, a permanent magnet field motor is shown that includes a cylindrical case 1 closed at its ends by end member or bells 2 and 3 that are molded from a plastic. An armature 4 inside the case is rotatably mounted in the end bells. Permanent magnet fields 5 are secured to the inside of the case around the armature. The usual commutator 6 is electrically connected with the armature and is engaged by a pair of brushes 7 mounted in brushholders 8 on the end bell 2 of the case. Extending through the same end bell is a pair of power input terminals 9 that are electrically connected with the brushes and that receive electric current from power input leads (not shown).

It is a feature of this invention that there are three capacitors inside the motor case. One is electrically connected across the terminals and the other two connect the terminals and brushes with a grounding member that engages the inner surface of the case. Although the capacitors and grounding member can be connected to the terminals after the terminals have been mounted in place, it is preferred to assemble them with the terminals and brushes into a unit outside of the motor and then mount the unit in the motor as the motor is being assembled. The unit can be made by someone other than the motor manufacturer.

Figure 4:
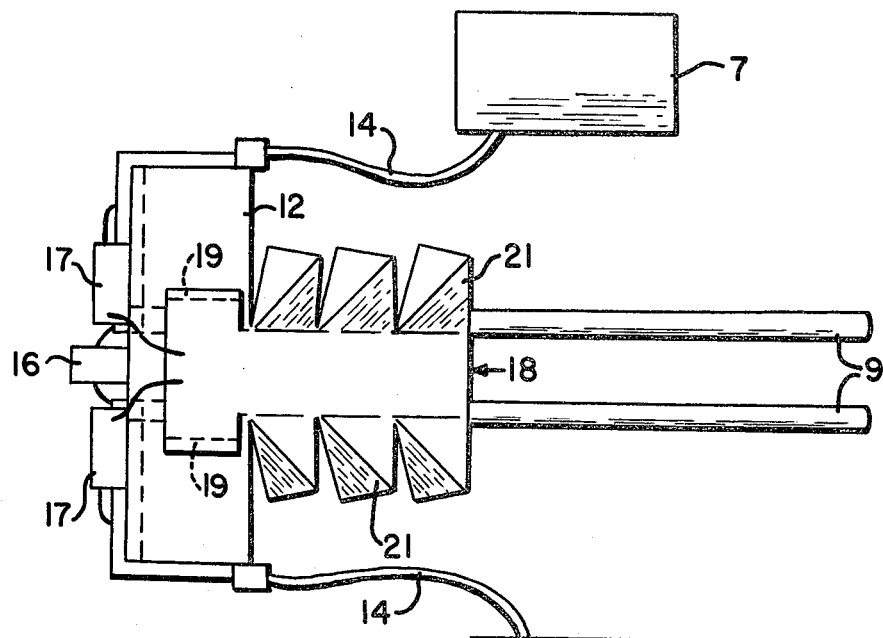
FIG. 4 is an enlarged plan view of the radio-frequency interference suppressing unit before installation.
Figure 5:
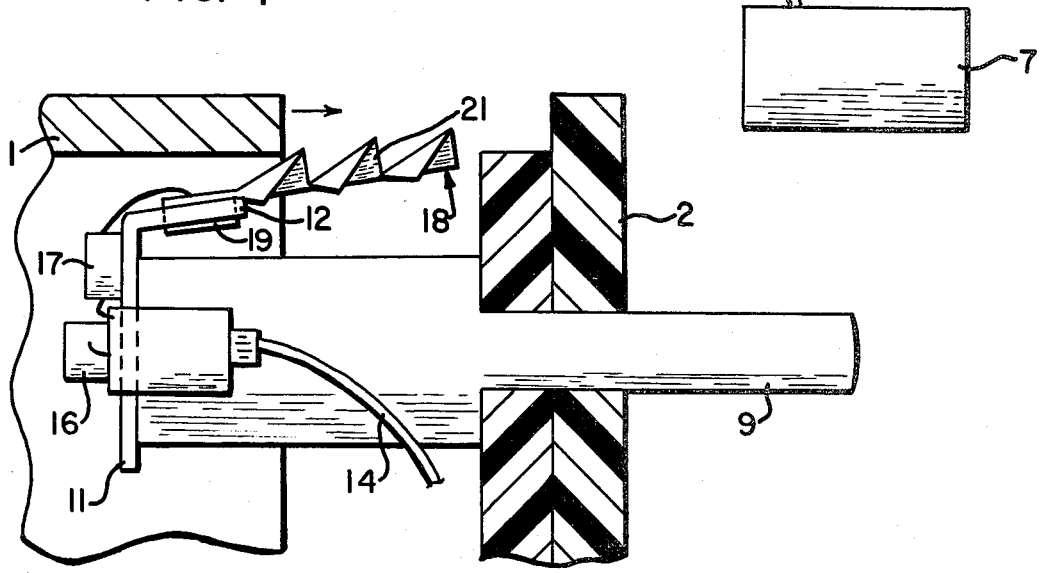
FIG. 5 is a fragmentary longitudinal section showing the motor case being moved toward an end bell for assembly therewith around the suppressing unit.

Accordingly, to form such a unit as shown in FIGS. 1, 2, 4 and 5, there is provided an insulating member in the form of a short rigid strip of electrical insulation having a terminal wall 11 and a ground wall 12 disposed at an oblique angle to each other (FIGS. 1 and 5). The terminal wall is provided with a pair of laterally spaced parallel slots 13 (FIG. 2), in which the inner ends of terminals 9 are rigidly mounted in any suitable manner. Soldered, welded or crimped to the inner ends of the terminals projecting from the insulating strip are flexible wire leads 14 electrically connecting the terminals with brushes 7.

Figure 3:
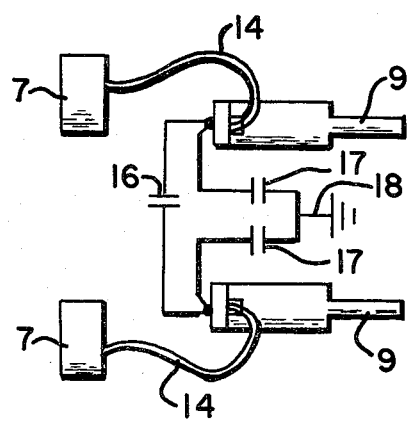
FIG. 3 is an electric circuit diagram.

Connected across the terminals is a capacitor 16 that has its short leads secured to the projecting inner ends of the terminals. There also are two further capacitors 17, each electrically connected with a different one of the two terminals by having one of its leads secured to the inner end of a terminal. The other leads of these two capacitors are secured to the inner end of a grounding member 18 that is rigidly connected to the ground wall 12 of the insulating strip. The circuit is illustrated in FIG. 3. The values of the capacitors depend upon the particular motor in which they are installed and on the frequency band desired to suppress the noise.

The grounding member preferably is a thin resilient metal strip that is a good electrical conductor. It is provided at its inner end with bent-down tangs 19 that extend down through a pair of slots in the ground wall of the insulating strip and are bent below it to secure the two members together. The grounding strip extends outwardly along the terminals and, by reason of the inclination of the ground wall of the insulating strip, is inclined upwardly away from the terminals.

The unit thus formed, as shown in FIG. 4, is mounted in place by projecting the two terminals through slots in end bell 2. The terminals fit very tightly in the slots and their projecting outer ends are adapted to receive an electrical connector (not shown), by which electric current can be supplied to them to operate the motor. After the unit has been assembled with the end bell, with the brushes in brush holders 8, the shaft of armature 4 is also inserted in that end bell, with the inner ends of the brushes engaging the commutator. Following this, the cylindrical case, with the permanent magnet fields 5 in place, is slipped over the armature and pushed into place against end bell 2. As shown in FIG. 5, inclination of grounding strip 18 is such that as the case is moved toward the end bell the inside of the case will engage the grounding strip and slide along it while pressing the strip toward the terminals to insure firm contact with it. This grounds capacitors 17 to the case.

Figure 6:
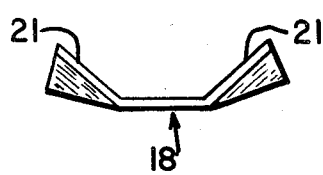
FIG. 6 is an end view of the free end of the grounding strip.

To assure a good electrical connection between the grounding strip and case, the strip is provided along its edges with teeth that scrape against the case during assembly and thereby cut through any dirt or film that might jeopardize the connection. Preferably, the teeth 21 are formed by providing opposite edges of the strip with parallel slits. The teeth are bent away from the terminals at an inclination to the central portion of the strip as shown in FIG. 6. The free corner of each tooth closest to the insulating strip preferably is bent down toward the terminals so that the other free corner of the tooth forms a point that engages the inside of the case.

With the system disclosed herein, the capacitors connected to the terminals are automatically grounded when the motor case is assembled with the end bell that carries the terminals. This grounding suppresses radio-frequency interference by the motor. Since the capacitors are located inside the motor, they come with it and are out of sight and are protected. It is not necessary to add capacitors and a wiring network outside of the motor.

Figure 7:
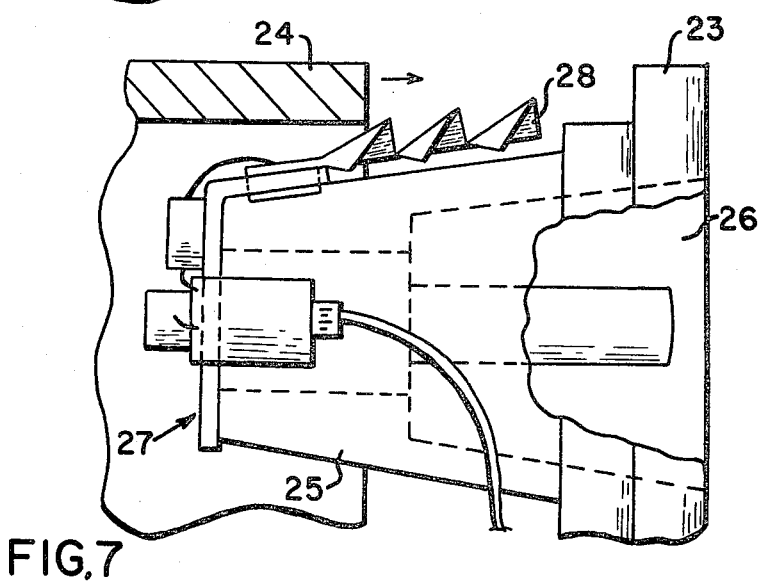
FIG. 7 is a view similar to FIG. 5 of a modification.

In the modification shown in FIG. 7, the suppression unit is similar to the one first described. However, end bell 23 for motor case 24 is provided with an inwardly projecting integral terminal block 25 provided with slots for receiving the inner portions of the terminals. The outer portion of this molded block and the adjoining portion of the end bell are provided with a cavity 26 that houses and protects the outer portions of the terminals of the suppression unit 27 and forms a socket for an electrical plug. The grounding strip 28 of the suppression unit closely overlies terminal block 25 so that when the case is forced over points on the grounding strip the block will serve as a back-up support for the strip.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A radio-frequency interference suppressing system for inside a permanent magnet field motor case, comprising a pair of commutator brushes, a pair of power input terminals electrically connected with said brushes, a capacitor electrically connected across the terminals, a pair of capacitors each electrically connected to a different one of said terminals, and a resilient metal grounding strip electrically connected with said pair of capacitors for pressing against the inside of the motor case, an insulating member provided with laterally spaced openings receiving the inner ends of said terminals and supported thereby, one end of said grounding strip being rigidly attached to said insulating member, and said strip extending from the insulating member in the same general direction as said terminals.

2. A radio-frequency interference suppressing system according to claim 1, in which said grounding strip normally is inclined outwardly away from said terminals.

3. A radio-frequency interference suppressing system according to claim 1, in which said strip is provided along its opposite side edges with inwardly extending slots defining teeth, each tooth is bent away from the terminals at an inclination to the central portion of the strip, and the corner of each tooth nearest said insulating member is bent toward the terminals to provide for point contact of the tooth with the case.

4. A radio-frequency interference suppressing system according to claim 1, in which said insulating member is provided with a pair of laterally spaced slots, and said one end of the grounding strip is provided with a pair of tangs extending through said slots and rigidly mounted therein.

* * * * *